United States Patent
Mayet

(10) Patent No.: US 7,128,116 B2
(45) Date of Patent: Oct. 31, 2006

(54) DEVICE FOR THE FABRICATION OF A TIRE REINFORCEMENT, SUITABLE FOR TIRES OF LARGE WIDTH

(75) Inventor: Jean-Claude Mayet, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 55 days.

(21) Appl. No.: 10/725,761

(22) Filed: Dec. 1, 2003

(65) Prior Publication Data

US 2004/0108072 A1 Jun. 10, 2004

(30) Foreign Application Priority Data

Dec. 4, 2002 (FR) .................................. 02 15306

(51) Int. Cl.
*B29D 30/16* (2006.01)
(52) U.S. Cl. ..................... 156/397; 156/398
(58) Field of Classification Search ............. 156/117, 156/397, 133, 398, 446
See application file for complete search history.

(56) References Cited

U.S. PATENT DOCUMENTS

| 3,082,140 | A | 3/1963 | Vanzo |
| 4,830,781 | A | 5/1989 | Oswald |
| 2001/0023736 | A1* | 9/2001 | Mayet ............... 156/117 |
| 2002/0117251 | A1* | 8/2002 | Mayet ............... 156/130.7 |
| 2002/0117265 | A1* | 8/2002 | Mayet ............... 156/400 |

FOREIGN PATENT DOCUMENTS

| EP | 1 101 597 A2 | 5/2001 |
| EP | 1 122 057 A2 | 8/2001 |
| EP | 1 231 049 A2 | 8/2002 |

* cited by examiner

*Primary Examiner*—Geoffrey L. Knable
(74) *Attorney, Agent, or Firm*—Cohen, Pontani, Lieberman & Pavane

(57) ABSTRACT

Device for fabricating a tire reinforcement by laying a cord 4 on a core 1. An arm 131 is mounted on a carriage 130, which is itself mounted on a rail 132 in such manner that it can slide parallel relative to the rotation axis of the core 1.

8 Claims, 4 Drawing Sheets

DEVICE FOR THE FABRICATION OF A TIRE REINFORCEMENT, SUITABLE FOR TIRES OF LARGE WIDTH

FIELD OF THE INVENTION

The present invention relates to the manufacture of tires. More precisely, it concerns the positioning of cords to constitute a tire reinforcement. More particularly, it proposes means suitable in particular for fabricating such reinforcement on a form close to or identical with the shape of the tire's internal cavity, i.e. one having an essentially toroidal shape, which supports the tire blank during its fabrication.

BACKGROUND OF THE INVENTION

In this technical field processes and equipment are already known which enable the fabrication of tire reinforcements to be integrated with the assembly of the tire itself. This means that rather than having recourse to semi-finished products such as reinforcement plies, one or more reinforcements are made in situ, as the tire is being fabricated, and from a cord spool. Among the processes and equipment, the solution described in patent application EP 1 122 057 is well suited to the production of carcass reinforcements on a rigid core whose outer surface corresponds essentially to the shape of the internal cavity of the final tire. The document describes a device in which the cord intended to form a carcass reinforcement is positioned in contiguous arcs on a rigid core by a mechanism having at least two arms arranged in cascade, which undergo a back and forth movement around the core so as to put in place, progressively and in a contiguous manner, an arc each time it moves one way and an arc each time it moves the other way, with pressing elements appropriate for applying the ends of the arcs as they are formed on the rigid core. The core has previously been covered with uncured rubber in accordance with the structure of the tire, which has the advantageous property of allowing the arcs to be stuck on and kept in place sufficiently well at least for the purposes of fabrication.

The prior art includes several other devices with one or more arms which undergo alternating movements to transport an eyelet (or other cord laying element with a similar function) from one side to the other of the form serving as the build-up support for a tire. Reference can be made to patent applications EP 0 962 304, EP 1 231 049 and EP 1 231 050.

If it is desired to construct a device that can fabricate tires of very large width, it may be necessary to have equipment whose radial dimension is accordingly large relative to the build-up form, in particular of a size that can become considerably larger than for a chain device such as that described in patent application EP 0 580 055.

SUMMARY OF THE INVENTION

One object of the present invention is to increase the capacity of devices designed on the principle of one or more arms which undergo alternating movements in order to build up tires of large width, without making the devices too heavy and while keeping them as compact as possible.

This and other objects are attained in accordance with one aspect of the invention directed to a device for fabricating a tire reinforcement, the device being designed to produce a reinforcement formed from a cord. The device comprises a frame and is intended for use in cooperation with an essentially toroidal form mounted on the frame so that it can rotate about a rotation axis, on which the reinforcement is built up progressively by laying arcs of the cord along a trajectory desired for the cord at the surface of the form. A cord laying element is provided through which the cord can slide. An actuation mechanism comprises at least one arm on which the cord laying element is mounted directly or indirectly, the actuation mechanism being designed to transport the cord laying element in a cyclic, back and forth movement, and which moves it in successive cycles close to each of the ends desired for the cord in the trajectory. Pressing elements close to each end of the trajectory are included for applying the cord onto the form at least at the ends. The actuation mechanism is mounted on the frame via a support which is itself mounted on means that allow a degree of freedom relative to the frame, which means allow a parallel movement relative to a plane tangent to a cylinder coaxial to the rotation axis of the form.

An advantage of this design is that it provides the actuation mechanism with an additional degree of freedom by the functional transverse translation of a support on which it is mounted, and in this way increases the ability to lay cord in widths parallel to the rotation axis of the tire building form, without any substantial increase of the radial dimension of the device.

The invention can be used with numerous reinforcement cord laying mechanisms, among the known mechanisms particularly those with alternating arm(s) described in the patent applications cited earlier, or even that described in the patent application filed on the same day by the same applicants and having the title "Device for the fabrication of a tire reinforcement, having multiple positioning arms which undergo a movement guided by a cam follower sliding in a slot".

Two example applications are given below: an example in which the actuation mechanism comprises a single oscillating arm at whose end the cord laying element is mounted directly. The second example shows an actuation mechanism comprising multiple oscillating arms: the actuation mechanism comprises a main arm mounted at the end of two auxiliary arms, and the cord laying element is mounted directly at the end of the main arm. Of course, these examples are not limiting. In the above examples, because they are all directed to the manufacture of a radial tire, said means allowing a degree of freedom provide for a movement parallel to the rotation axis of the form, this feature being not limiting the scope of the invention.

The reader is invited to consult in greater detail, in particular for example patent application EP 1 122 057, because the tire fabrication process implemented in the present application is identical to that of the application. The device is intended for use with a motorization system that controls in synchronism the rotation of the form, the actuation mechanism and the pressing elements. In addition, the present invention uses the pressing elements described in patent application EP 1 122 057 (an assembly comprising a hammer and a fork), to allow the formation of a loop with the reinforcing cord and to apply the loop against the core.

Before embarking on a detailed description of the new means of actuating the cord laying element, a few useful points will be recalled.

Note, first, that as in the patent application E 1 122 057 already cited, the term "cord" is of course used in an entirely general sense, which encompasses a monofilament, a multifilament, an assembly such as a cable or yarn, or a small number of cables or yarns grouped together, and this regardless of the nature of the material, and that the "cord" may or may not be pre-coated with rubber. In the present text the term "arc" is used to denote a section of cord extending from a particular point to another in the reinforcement. The totality of these arcs arranged all around the tire builds up the reinforcement itself. An arc in the sense defined here can be part of a carcass, or a crown reinforcement, or any other type of reinforcement. These arcs may be individualized by cutting the cord while positioning it, or they may all be interconnected in the final reinforcement, for example by loops.

Basically, the invention relates to the continuous laying of a reinforcing cord in a configuration as close as possible to its configuration in the final product. The cord is fed in as required by a suitable distributor comprising for example a cord spool and if necessary a device to control the tension of the cord reeled off the spool. The device for fabricating a reinforcement from a single cord cooperates with a form (rigid core or reinforced membrane) on which the tire is built up. It is of little importance whether the reinforcement is fabricated in several successive rotations of the form in front of the cord laying elements described, with or without cutting of the cord between successive rotations.

When positions, directions or senses are defined using the words "radially, axially, circumferentially", or when radii are mentioned, these terms relate to the core on which the tire is being built up or to the tire itself, which amounts to the same thing. The reference geometrical axis is the rotation axis of the form.

In addition, the cord laying elements described here also make it possible to produce a reinforcement, for example a carcass reinforcement, with variable spacing of the cord. "Spacing" is understood to mean the distance comprising the interval between two adjacent cords plus the diameter of the cord. It is well known that for a carcass reinforcement the interval between cords varies depending on the radius at which it is measured. It is not that variation which is referred to here, but a spacing variation at a given radius. To produce this it is sufficient, without changing the working rate of the cord laying element, to vary the form rotation speed in accordance with any appropriate law. This gives a tire whose carcass reinforcement cords, for example in the case of a radial carcass, are arranged according to a controlled spacing variation for a given radial position.

Finally, the single or multiple arm(s) cause(s) the cord laying element to undergo movement essentially confined to a plane—hereinafter called the movement plane—perpendicular to the geometrical rotation axis of the arm(s). In certain particular implementations of the invention, as in the patent application EP 1 122 057 cited earlier, the movement plane is itself subject to a movement with a functional role, as will become apparent below.

BRIEF DESCRIPTION OF THE DRAWINGS

The remainder of the description, which refers to the following figures, makes clear all aspects of the invention.

DETAILED DESCRIPTION OF THE DRAWINGS

Figure 1:
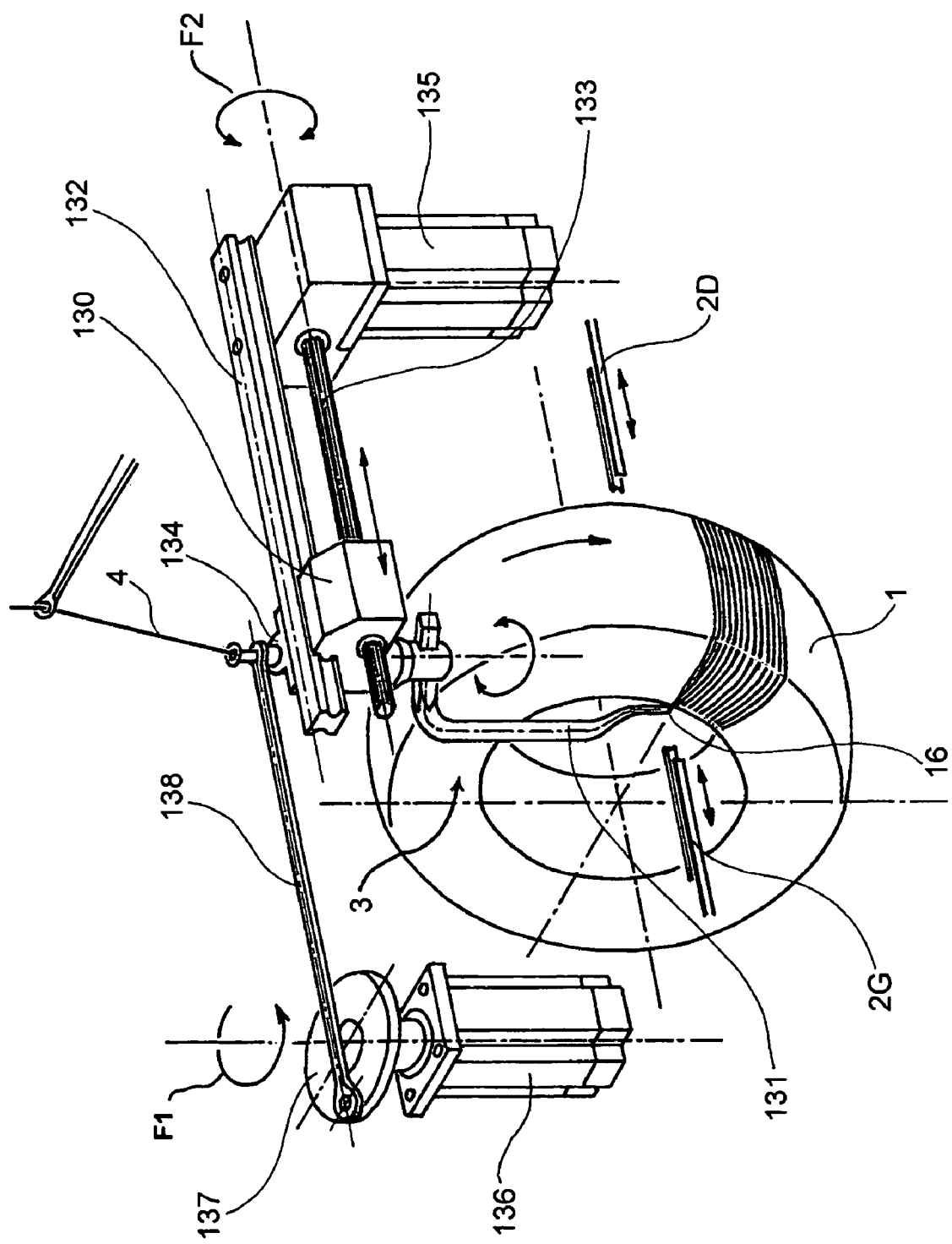
FIG. 1 is a schematic perspective view of a first embodiment of a device according to the invention.

In FIG. 1 (and indeed in all the examples described, although this is not limiting), the form is a core 1 (rigid and capable of disassembly) which defines the geometry of the internal surface of the tire. This is coated with rubber 10 (see FIG. 2), for example with a layer of gas-impermeable rubber based on butyl rubber and a layer of rubber that ensures the anchoring of the carcass cords on the core during fabrication and then their embedding within the vulcanized tire. The rubber 10 covering the core 1 enables a cord 4 to be retained on the core 1 as it is laid, by a sticking effect. Of course, the core 1 is driven in rotation by any appropriate means (not shown).

FIG. 1 shows an actuation mechanism 3 with a single arm similar to that described in patent application EP 1 231 049. A single arm 131 can be seen, mounted on a carriage 130. This carriage 130 constitutes a support carrying the actuation mechanism, here consisting of the single arm 131. The carriage 130 is mounted to slide on a rail 132. The carriage 130 comprises a foot 134 to which a rod 138 is articulated. The rod 138 is also articulated to a crank 137 driven in rotation by a motor 136. The motor's rotation movement does not reverse; of course, the device's operation rate is proportional to the rotation speed of the motor 136. To operate the device at a constant rate, i.e. so that a constant number of cord arcs is laid in unit time, the motor 136 can turn at constant speed (although this is not obligatory). This is symbolized in the drawing by an arrow F1 pointing in only one direction. The carriage 130 undergoes alternating translational movements guided by the rail 132. The amplitude of those movements depends on the size of the crank 137, which can be made adjustable (not shown).

The movement of the arm 131 is controlled by a motor 135 which drives a splined shaft 133. The splined shaft 133 passes through the carriage 130. The rotation movement of the motor 135 is not continuous: the motor 135 is controlled so as to obtain an alternating movement of predetermined amplitude, this movement being transmitted to the arm 131 via a simple movement relay inside the carriage 130 (not shown). In the drawing this type of alternating movement is symbolized by an arrow F2 pointing both ways. We will agree to denote this movement control by the expression "electric cam". Preferably, not only does this movement change direction, but its speed is varied continuously so as to obtain successive positions of the characteristic points which will be explained with reference to FIG. 2. Of course, the movements of the carriage 130 and the arm 131 are synchronized.

Figure 2:
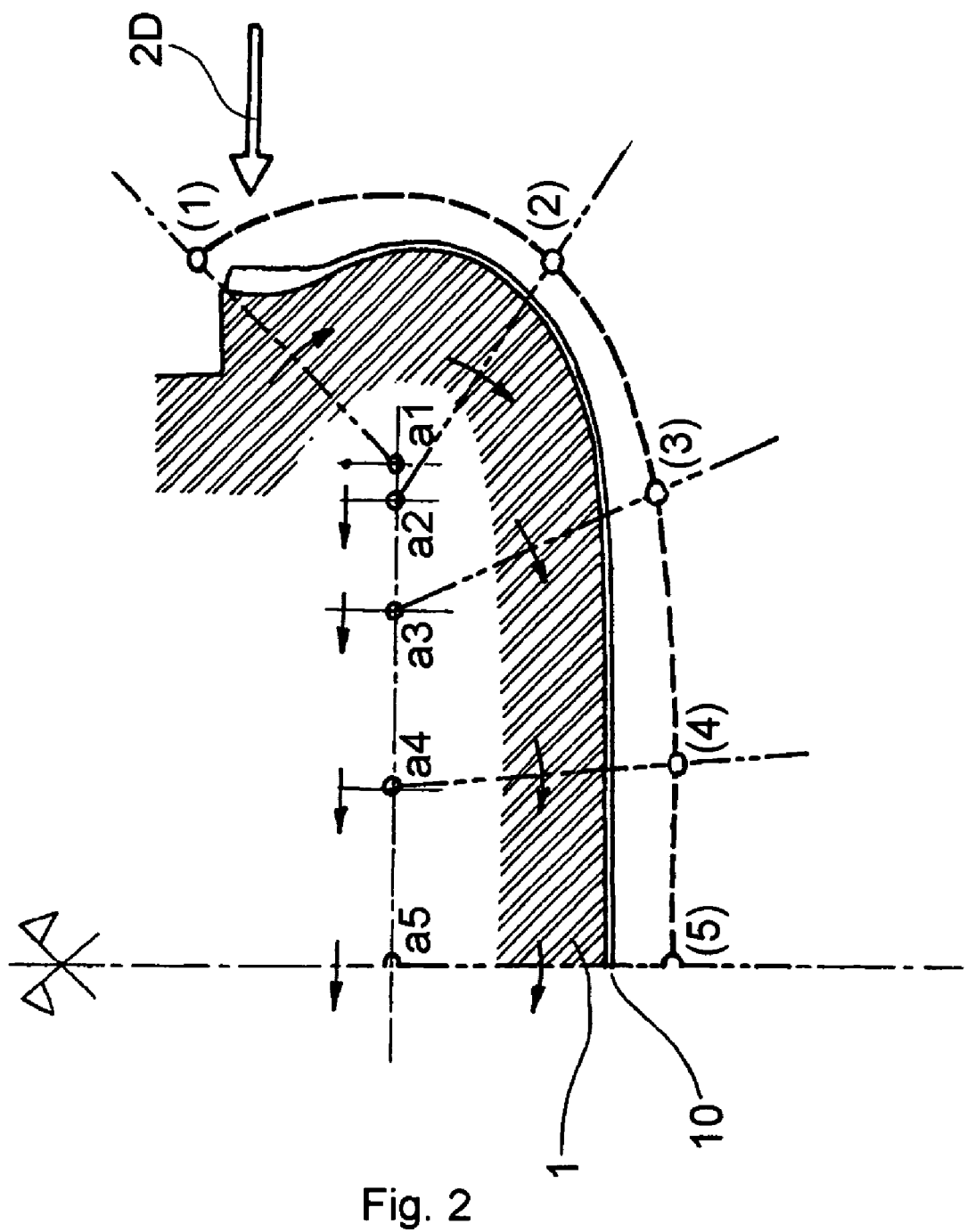
FIG. 2 represents successive stages in the operation of the first embodiment.

The translation movement of the carriage 130, combined with the movement of the arm 131, are illustrated in FIG. 2. Respective possible positions a1, a2, a3, a4 and a5 of the center of rotation of the arm 131 can be seen. Superposition of this transverse displacement on the intrinsic movement of the single-arm actuation mechanism (which is a circle: see patent application EP 1 231 049) gives the following overall movement: the curve drawn as a broken line and passing through points (1), (2), (3), (4) and (5) represents the movement of the end 16 of the cord laying arm 131, outside which the cord 4 is reeled off.

As a variant, the movement of the carriage 130 could have been controlled by an electric cam. Thus, each of the two movements (that of the arm 131 and that of the carriage 130) could be controlled by respective electric cams. As another variant, one or other of the movements of the arm 131 or carriage 130, or both of them, could be controlled by a mechanical cam system designed to give the preferred successive positions described in FIG. 2.

Figure 3:
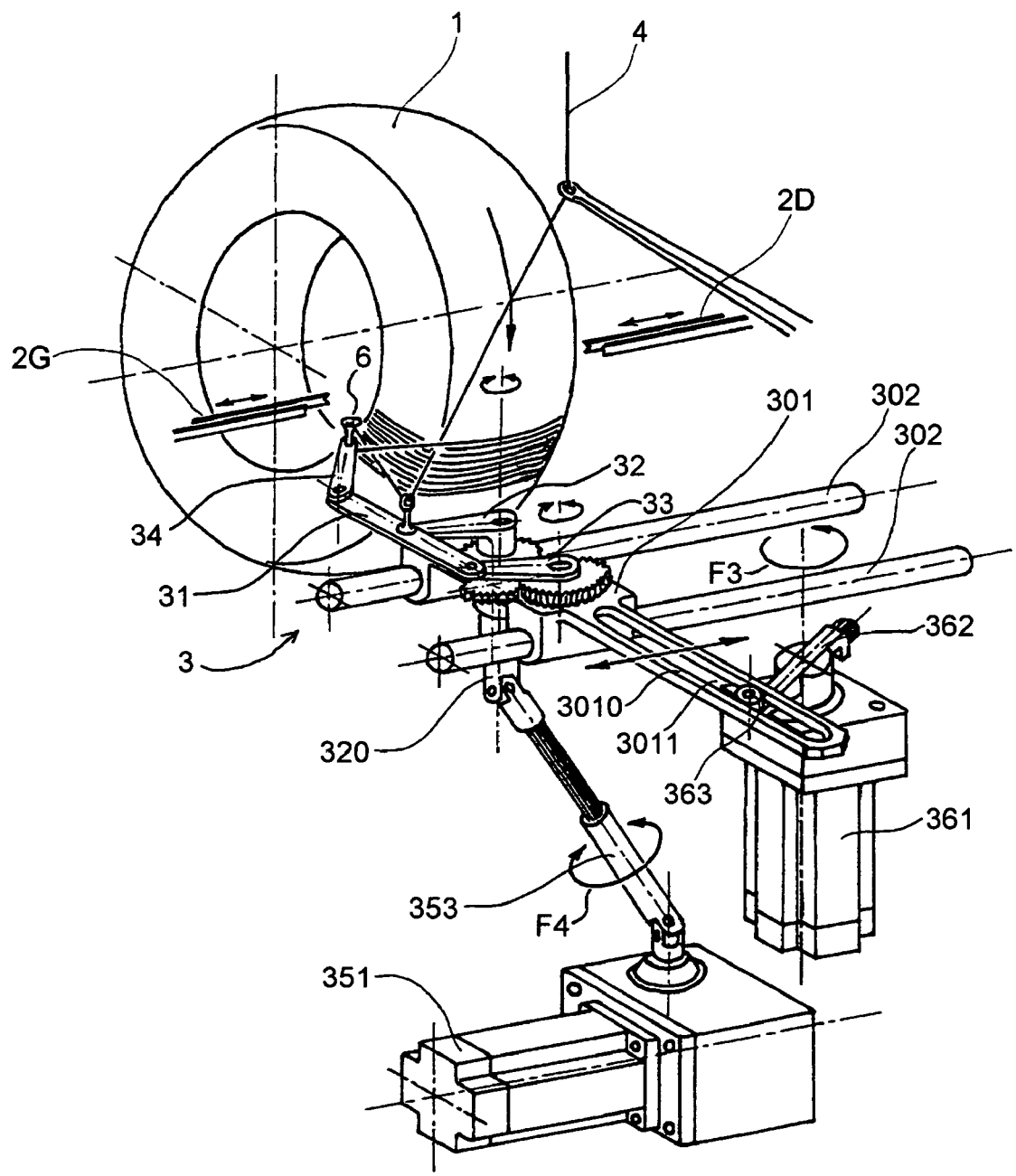
FIG. 3 is a schematic perspective view of a second embodiment of a device according to the invention.

In FIG. 3 the actuation mechanism 3 is similar to that already described in patent application EP 1 122 057. The cord laying element is an eyelet 6 mounted on an end arm 34. A main arm 31 is mounted on a carriage 301 by means of a front auxiliary arm 32 and a rear auxiliary arm 33. The front auxiliary arm 32 is mounted on a spindle 320 and the rear auxiliary arm 33 on a spindle 330. The end arm 34 inclines relative to the main arm 31 so as to bring the eyelet 6 close to the bead of the future tire, even in the case when the building form is narrower at the level of the tire bead than half-way up the sidewall. The degree of inclination, i.e. the approach towards the zone of the future tire bead, is carefully controlled in a manner whose details will be found by the reader in patent application EP 1 122 057 (not shown here, so as not to overcomplicate the drawing). The arms do not rotate continuously, but oscillate within the limits of an arc smaller than 360°, whose precise value depends on the exact constitution of the multiple-arm actuation mechanism 3 and on the application envisaged.

The carriage 301 is mounted and can slide on two parallel bars 302. The carriage 301 comprises a foot 3010 in which a slot 3011 is hollowed out. The carriage 301 can move in alternation, guided by the bars 302, thanks to a motor 361 which controls a lever 362. The motor's rotation does not reverse, and this is symbolized in the drawing by a one-way arrow F3 (which does not exclude variable speed). At the end of the lever 362 is attached a lug 363 which is engaged in the slot 3011.

The movement of the multiple-arm actuation mechanism 3 is controlled by a motor 351 which drives the spindle 320 via a telescopic spindle 353. The spindle 330 is driven by the spindle 320 via a gear system arranged on the carriage 301 and designed so that the spindle 320 can oscillate through an amplitude for example of about 240°. In the drawing this type of alternating movement is symbolized by a two-way arrow F4. In this embodiment as in the previous one, the movements can be controlled in many different ways using mechanical or electric cams.

Figure 4:
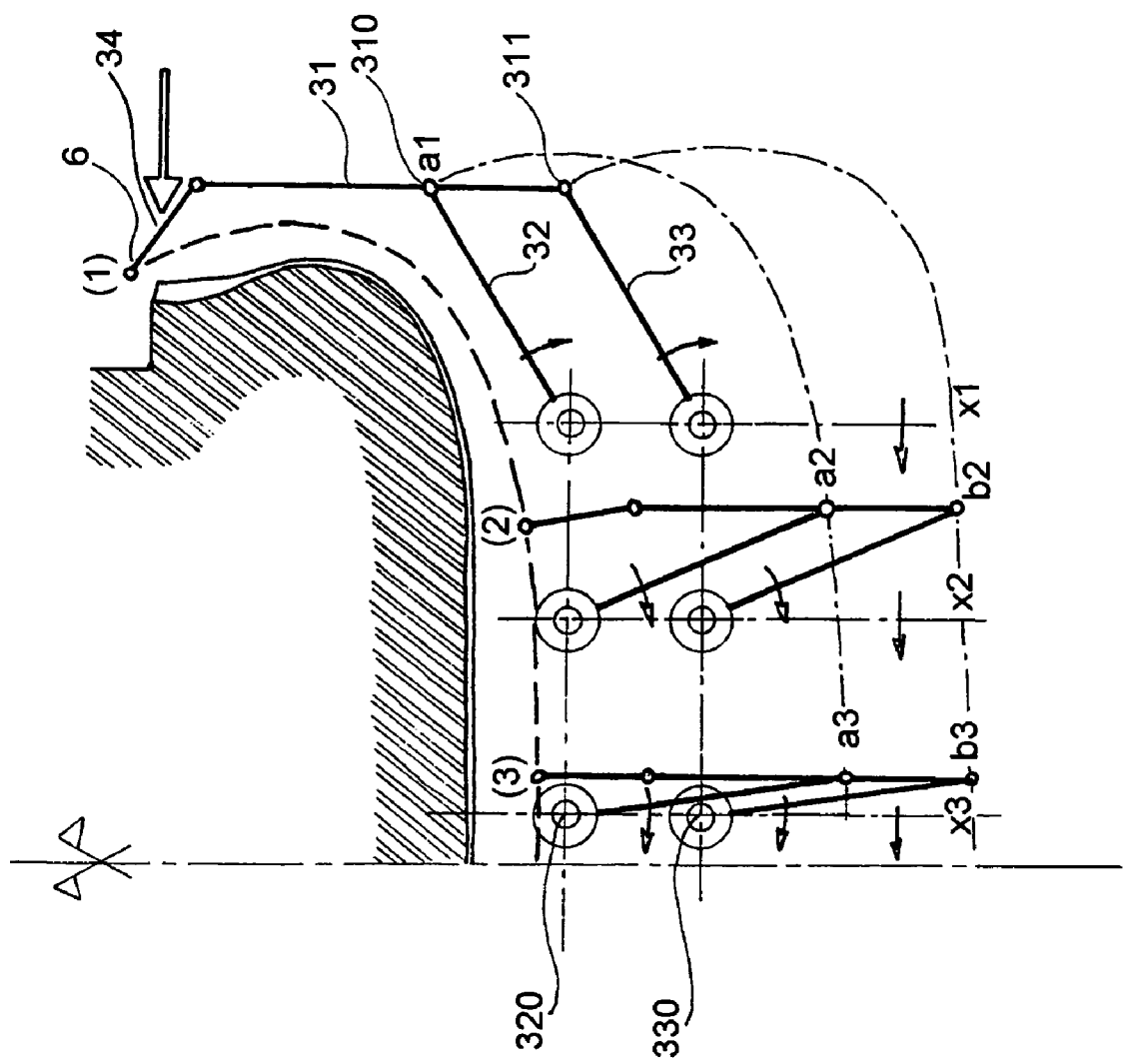
FIG. 4 represents successive stages in the operation of the second embodiment.

The translation movement of the carriage 301, combined with the movement of the multiple-arm actuation mechanism 3, are illustrated in FIG. 4. Respective positions x1, x2 and x3 are shown, which are the trace of an imaginary plane connecting the geometrical axes of the spindles 320 and 330. The displacement of the carriage 301 causes a displacement of the spindles 320 and 330, and hence a displacement of the centers of rotation of the front 32 and rear 33 auxiliary spindles. Superposition of this transverse displacement on the intrinsic movement of the multiple-arm actuation mechanism 3 as explained with the help of FIG. 2, gives the following overall movements: the curve drawn with a thick broken line passing through the points (1), (2), and (3) represents the movement of the eyelet 6; the curve drawn with a dot-dash line passing through the points a1, a2 and a3 represents the movement in space of the axis 310, i.e. also the movement in space of the center of rotation 31R of the main arm 31; finally, the curve passing through the points b1, b2 and b3 represents the movement in space of the lug 311.

The assembly constituting the actuation mechanism with arm(s) 3, whether with a single arm or with multiple arms, is fairly compact. The assembly constituting the cord laying elements, namely the multiple-arm actuation mechanism 3, and the control system for the carriage movement and the pressing elements 2, including the motor and the drive mechanism, form a sub-assembly that can easily be brought up to the core in an appropriate way and which can be moved out of the way, for example to allow other devices used for tire fabrication or for transferring the core to other tire building positions, to be brought up to the core.

I claim:

1. A device for fabricating a tire reinforcement made from a cord, said device comprising:
    a frame, wherein the device is adapted to cooperate with an essentially toroidal form which is mounted on said frame and able to rotate about a first rotation axis and on which the reinforcement is progressively built up by laying arcs of said cord along a trajectory desired for said cord on a surface of said toroidal form;
    a cord laying element through which said cord can slide;
    an actuation mechanism comprising an arm on which said cord laying element is mounted, said actuation mechanism being adapted to move said cord laying element in a cyclic, back and forth movement about a second rotation axis, bringing said cord laying element in successive cycles close to each end desired for said cord in said trajectory;
    pressing elements near each of said ends of said trajectory, to apply said cord onto said toroidal form at least at said ends; and
    a support mounted on a means that allows a movement of said support relative to said frame;
    wherein said actuation mechanism is mounted on said frame via said support for linear movement therewith in a plane parallel to said first rotation axis of said toroidal form and perpendicular to said second rotation axis, said linear movement being synchronized with said cyclic, back and forth movement, and said linear movement having a component directed parallel to said first rotation axis of said toroidal form.

2. The device according to claim 1, wherein said means allows said support to move in a direction parallel to said first rotation axis of said toroidal form.

3. The device according to claim 1, wherein said actuation mechanism comprises only a single oscillating arm, and said cord laying element is mounted on one end of said oscillating arm.

4. The device according to claim 1, wherein said actuation mechanism comprises multiple arms.

5. The device according to claim 4, wherein said multiple arms of said actuation mechanism comprise at least two auxiliary arms, and a main arm mounted on one end of each of said at least two auxiliary arms.

6. The device according to claim 5, wherein said cord laying element is mounted directly on one end of said main arm.

7. The device according to claim 1, wherein said cord laying element is an eyelet.

8. The device according to claim 1, further comprising a motorization system which is operable to control in synchronism a rotation of the toroidal form, and movements of said arm of said actuation mechanism, said pressing elements and said support.

* * * * *